United States Patent
Jones et al.

[11] 3,892,249
[45] July 1, 1975

[54] DENTAL FLOSS DEVICE

[76] Inventors: Franklin R. Jones, 80 Gorham Rd., Fairfield, Conn. 06430; Robert D. Ferguson, 55 Tanglewood Rd., Trumbull, Conn. 06611

[22] Filed: Apr. 24, 1974

[21] Appl. No.: 463,455

[52] U.S. Cl. ................................................. 132/89
[51] Int. Cl. ............................................. A61c 15/00
[58] Field of Search ..................... 132/89, 90, 91, 92

[56] References Cited
UNITED STATES PATENTS

| | | | |
|---|---|---|---|
| 893,345 | 7/1908 | Monson | 132/91 |
| 2,187,899 | 1/1940 | Henne | 132/91 |
| 2,612,176 | 9/1952 | Sam | 132/91 |

*Primary Examiner*—G. E. McNeill

[57] ABSTRACT

A dental floss device comprising a handle having a connected head portion to which a readily disposable dental floss holder is detachably connected. The head portion and disposable holder are provided with complementary mating portions which locks the holder in place in a manner whereby the device can be used in any position.

14 Claims, 12 Drawing Figures

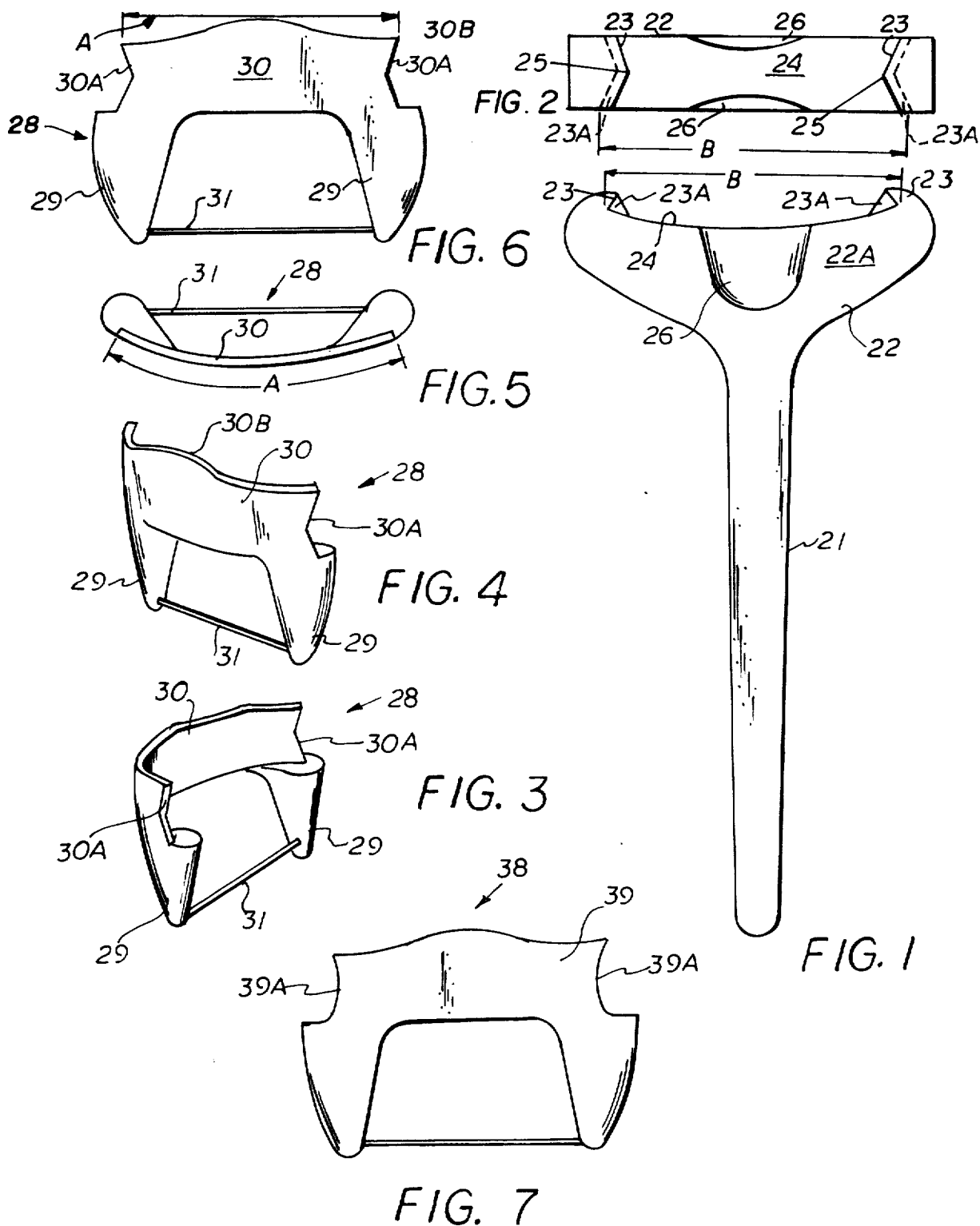

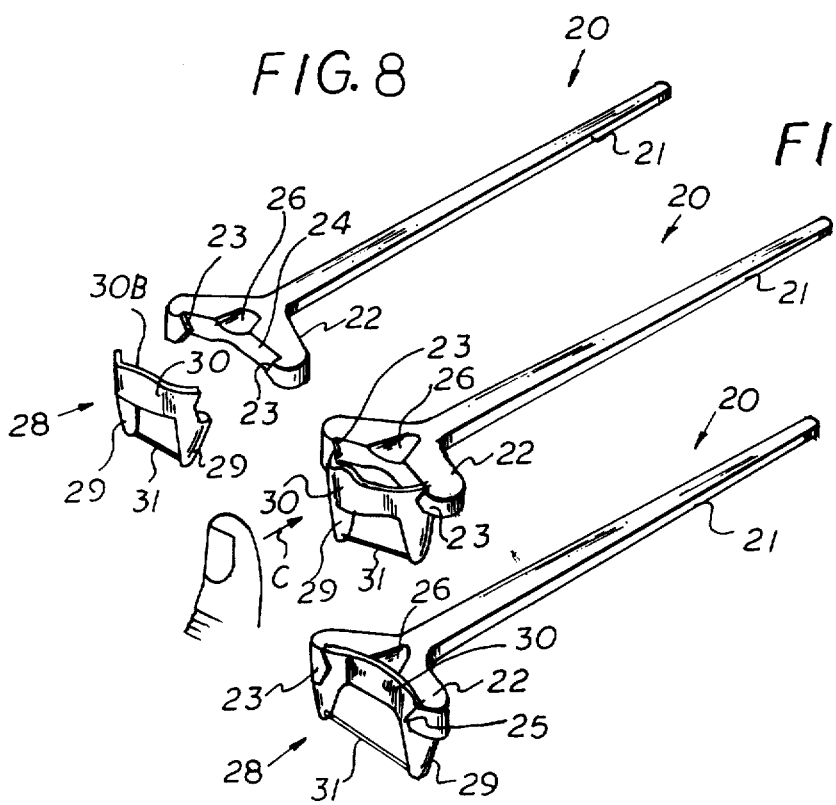

3,892,249

DENTAL FLOSS DEVICE

PROBLEM AND PRIOR ART

It has been established that tooth decay and dental desease is attributed to bacteriological action which results from the build up of plaque and/or the entrapment of food between the teeth. Brushing of teeth only has been noted to be insufficient for effecting the removable of trapped food particles and/or for the effective removal of plaque. It has been proven that an important preventive dental care of one's teeth is to regularly use dental floss as flossing of teeth is most effective in removing plaque and/or trapped food particles.

Heretofore normal use of dental floss consisted merely of taking a length of floss and passing the floss between one's teeth. However, one generally encountered difficulty in using such floss length in hard to reach areas, as for example, between the back molars. For this reason, plaque about these teeth could only be effectively removed by professional care.

To obviate this difficulty, many efforts have been made to provide a device for facilitating the use of dental floss. Some of the known attempts to improve dental hygene are evidenced by U.S. Pat. Nos. 2,162,240; 2,180,522; 2,187,899; 2,612,176; and 3,474,799. Each of the foregoing noted efforts sought to enhance dental care through the use of device or holder to facilitate the use of dental floss. However, for whatever reason, it is not known that any of the prior known efforts have achieved any degree of success.

OBJECTS

It is therefore an object of this invention to provide an improved inexpensive, sanitary, interchangeable and readily disposable dental floss unit that is simple to manufacture and use.

Another object is to provide a dental floss device in which the dental floss holder is rendered detachably connected to a rigid handle.

Another object is to provide a dental floss unit in which the holder is detachably locked in a positive locking manner.

Another object is to provide a sanitary dental floss holder which is securely attached to the handle so that it can be held in any position.

BRIEF SUMMARY OF THE INVENTION

The foregoing objects and other features and advantages are attained by a dental floss device which comprises a handle having a connected head portion to which a disposable dental floss holder is detachably connected. The disposable dental floss holder comprises a member having opposed extension arms interconnected by a flexible bridge which is normally bowed. The head portion of the handle is provided with opposed, inturned jaws and the opposed ends of the bridge of the dental floss holder are provided with complementary mating surfaces adapted to be received between the jaws to secure the holder in position relative to the head portion. The holder is locked in place between the jaws by displacing the bowed portion of the bridge against the head portion of the handle. The arrangement is such that the distance along the bow of the bridge is slightly greater than the distance between the jaws so that when said bowed bridge is displaced against the head of the handle, the dental floss holder is locked in place against the head. A length of dental floss is secured between the ends of the extension arms which floss is placed under proper tension when the holder is locked in place to the head. The head is provided with a thumb recess to facilitate the detaching of the holder from its handle.

FEATURES

A feature of this invention resides in the provision of a dental floss holder which can be readily and positively secured to the head portion of a handle.

Another feature resides in the provision that the holder and head portion of the handle are formed with complementary mating surfaces which will prevent the holder from being detached from the holder.

Another feature resides in a dental floss holder which is positively secured to the head portion of a handle by a locking toggle action.

Other features and advantages will become more readily apparent when considered in view of the drawings and specifications in which:

FIG. 1 is a top plan view of the handle means of a dental floss device embodying the present invention.

FIG. 2 is a front end view of the head portion of the handle means of FIG. 1.

FIG. 3 is a rear perspective view of the dental floss holder portion of the present invention.

FIG. 4 is a front perspective view of the dental floss holder portion of the present invention.

FIG. 5 is a top plan view of the dental floss holder of FIGS. 3 and 4.

FIG. 6 is a front elevation view of dental floss holder of FIGS. 3, 4, and 5.

FIG. 7 is a modified embodiment of a dental floss holder of the present invention.

FIG. 8 is a perspective exploded view illustrating the relationship between the handle means and dental floss holder of the present invention.

FIG. 9 is a perspective view illustrating the method of attaching the dental floss holder to the handle means.

FIG. 10 is a perspective view illustrating the dental floss holder in lock position to the handle means.

FIG. 11 is a top plan view illustrating the dental floss holder in lock position to the handle means.

FIG. 12 is a perspective view of a modified embodiment.

Referring to the drawings, there is shown a dental floss device 20 embodying the present invention. The dental floss device 20 comprises a handle means 21 which may be formed of any suitable rigid material, e.g., plastic, wood, or metal, having a transversely extending head portion 22. As best seen in FIGS. 1 and 2, the head portion 22 is provided at its end portions with oppositely disposed inturned jaws 23—23. The portion of the head 22 extended between the jaws 23—23 is formed with a slightly concaved curvature 24. As best seen in FIGS. 1 and 2, the respective jaws 23—23 having inclined surfaces which converge to an apex 25 intermediate the width thereof. As noted in FIG. 2, the inner surface 23A of the respective jaws incline rearwardly so as to define a dove tail type slide which is generally V-shaped. The top and bottom surfaces 22A of the head portion 22 intermediate the jaws 23—23 are provided with a recess 26 for reasons which will be hereinafter defined.

A readily disposable and expendable dental floss holder 28 is provided, and it is specifically constructed so as to be rendered readily, detachably connected to the head portion 22 of the handle means 21. As best seen in FIGS. 3 through 6, the dental floss holder 28 comprises a member which is formed of a suitable flexible material such as a readily flexible plastic material. The dental floss holder 28 comprises a pair of opposed extension arms 29—29 which are interconnected by a connecting bridge portion 30. The bridge portion 30 is normally bowed outwardly or convexly as seen in FIG. 5. A length of dental floss 31 is secured between the ends of the extended arm portions 29—29. It will be understood that the dental floss segment 31 can be suitably secured to the extended arms by any suitable means or molded integrally therewith.

The dental floss holder 28 is preferably formed of an inexpensive material, e.g., plastic, whereby the same can be rendered readily disposable or expendible after use.

As best seen in FIGS. 3, 4, and 6, the opposed end portions 30A of the bridge 30 are shaped to define a V-shaped notch which is adapted to complement the inner surfaces 23A of the opposed jaws 23—23 of the head portion. As seen in FIG. 5, the distance A along the curve or bowed portion of the bridge 30 is made slightly greater than the distance B between the opposed jaws 23—23 of the head portion as seen in FIGS. 1 and 2. While the dental floss holder 28 is made of an inexpensive material so that it can be rendered readily expendable, the handle portion 21 may be formed of a more rigid material whereby it can be reused with additional floss holder. However, if desired the handle portion may likewise be made of a readily expendable material, in which case, the entire unit may be disposed of after use.

Referring to FIGS. 8 through 10, it is to be noted that the bridge portion 30 of the disposable dental floss holder 28 is bowed outwardly in amount sufficient to permit the opposed ends 30A, 30A thereof to be readily passed or positioned between the opposed inturned jaws 23, 23 of the head portion 22 of the handle means 21. The dental floss holder 28 in accordance with this invention is positively secured and locked in place between the inturned jaws 23—23 of the head portion 22 simply by applying pressure to the bowed portion of the bridge to effect a displacement or flexing of the bridge 30 toward the concaved surface 24 of the head portion 22. The application of thumb pressure in the direction of arrow C as viewed in FIG. 9 will effect the displacement of the bridge portion 30 of the dental floss holder 28 to a locked position as seen in FIG. 10. Because the distance A along the bowed bridge 30, as seen in FIG. 5, is slightly greater than the distance B between the jaws 23—23 as seen in FIGS. 1 and 2, the bridge 30 is securely locked between opposed jaws. As the thumb pressure is applied against the bridge 30 of the dental floss holder, the holder is flexed through its straighten or neutral axis to lock against the handle portion 24 between jaws 23—23. Since the surface between the jaws of the head portion 22 is concaved inwardly, a toggle locking effect is provided as the bridge is flexed inwardly toward the head portion 22 in passing through the dead center position thereof. As the bridge is flexed toward locking position, the proper tension is applied to the dental floss 31 extended between the extended arms 29—29 to provide the requisite tautness.

Because of the complementary mating surfaces between the ends 30A, 30A of the bridge and the surfaces 23A, 23A of the inturned jaws 23, it will be noted that the holder portion 28 is firmly secured and locked in place between the jaws so that the dental floss device 20 can be applied to either the upper and lower teeth with equal facility. Therefore whether pressure is applied by the holder in a downward or upward position, the holder portion 28 is secure between the inturned jaws 23—23. With the holder 28 in position and locked in place to the head portion 22, the device 20 is ready for use simply by inserting the holder 28 in the mouth while firmly gripping the handle. The device 20 described will enable a user to reach any of the crevices formed between any pair of adjacent teeth, thereby enabling an effective removal of the plaque or lodged food in such crevices.

To dispose of the dental floss holder 28 from the handle 21 after use, the user simply places his thumb in either of the thumb recesses 26 formed on the holder head and apply pressure against the back of the bridge 30 to deflect the same away from the head portion. As soon as the bridge 30 passes through the dead center position, it will tend to assume its normally outwardly bowed position as seen in FIGS. 3 or 8 whereby it can be readily dispensed into an appropriate waste receptible. By locating depressions or recesses 26 on the upper and lower surfaces of the handle, the holder may be readily disengaged from the handle from either side. If desired the bridge of the holder may be formed with a raised center portion as at 30B to provide a tab to facilitate the removal of the holder.

FIG. 7 illustrates a slightly modified version of the dental floss holder 28 described. In this form of the invention, the dental floss holder 38 is identical to that described with respect to FIGS. 3 through 6, with the exception that the end 39A, 39A of the bridge 39 are defined by an arc. It will be understood that the head portion of the holder or handle means adapted to receive the modified construction holder 38 of FIG. 7 be formed with opposed jaws having complementary curved surfaces adapted to complement the arcuate curvature 39A of FIG. 7. Thus the co-action between ends 39A—39A and its complementary handle means is similar to the co-action described between bridge 30 and jaws 23—23. In all other respects the operation and construction of holder 38 is similar to that described with respect to FIGS. 1 through 6 and 8 through 11.

From the foregoing, it will be noted that the dental floss holder 28 or 38 is readily formed as an integral member of readily inexpensive and expendable plastic material and which is rendered sufficiently flexible whereby it can be positively locked to the head portion 22 of a handle means 21 simply by effecting a slight displacement of the bridge portion thereof through its dead center or neutral axis. Also, that the complementary mating surfaces between the ends 23A or 39A of the bridge 30 or 39 and the complementary jaws of the associated head portion of the handle means are such that the holder is locked in position between the jaws and permit the user to apply holder to the teeth in any direction. It will be understood that the dental floss holder 28, 38 is made sufficiently small so that it can be readily received in one's mouth so that the user will be able to reach all of the difficult to reach areas of the mouth. The unit described thus provides an effective tool whereby a user can provide for himself the requisite preventive dental care by providing for the removal of plaque and/or food particles which normally lodge between the teeth. The described device enables the user himself to reach the difficult hard to reach areas more conveniently which heretofore the user could not conveniently reach with ordinary dental floss.

FIG. 12 illustrates a modified form of the invention wherein the dental floss holder, e.g., holder 28 is detachably secured to a handle means 40 which is modified from that hereinbefore described so that the length of dental floss 31 is disposed parallel to the handle portion 40A of the handle means 40. As shown, the handle means includes a head portion 41 which is integrally formed as an extension of the handle portion 40A.

The head portion 41 is provided along one side thereof with a slightly concaved curvature 42 which terminate at inwardly turned jaws 43—43 which are shaped similarly to the jaws 23—23 described with respect to the embodiment of FIG. 1. By disposing the head portion 41 of the handle means in longitudinal alignment with the handle portion 40A, the length of dental floss 31, when the dental floss holder is attached, extends longitudinally so that the device may be held and used lide a tooth brush. In some instances, it may provde for greater access to difficult to reach areas of the mouth. In all other respects, the operation and construction, the embodiment disclosed in FIG. 12 is similar to that described with respect to FIG. 1.

While the invention has been described with respect to particular embodiments thereof, it will be appreciated and understood that variation and modification may be made without departing from the spirit or scope of the invention.

What is claimed is:

1. A dental device comprising
   a handle means,
   means defining a head portion connected to said handle means,
   said head portion having oppositely disposed jaw portions,
   a readily disposable dental floss holder adapted to be detachably connected to said head portion,
   said floss holder including opposed extension arms and a flexible bridge interconnecting said extension arms,
   said bridge being slightly convexly curved so that the distance measured along the curve is slightly greater than the distance between said oppositly disposed jaw portions of said head portion,
   a length of dental floss extended between said extension arms,
   and said holder being detachably connected to said head portion between said jaw portion by deflexion of said convexly curved bridge toward said head portion whereby said bridge is tightly wedged between said jaw portions.

2. The invention as defined in claim 1 wherein said jaw portions and the ends of said bridge are defined by complementary mating surfaces.

3. The invention as defined in claim 2 wherein ends of said bridge define a V-notch,
   and said jaw portions are defined as complementary V projections adapted to receive said V-notched ends of said bridge.

4. The invention as defined in claim 1 wherein the head portion between said jaw portions is concavely curved.

5. The invention as defined in claim 1 wherein said head portion includes a recessed portion intermediate the ends thereof.

6. The invention as defined in claim 1 wherein said dental floss is molded integral with said extension arms.

7. The invention as defined in claim 1 wherein the ends of said bridge define a segment of an arc.

8. The invention as defined in claim 7 wherein the said jaw portions having mating surfaces complementing the arcuate segment of said ends of said bridge.

9. A dental floss holder comprising
   member having a flexible bridge portion, and a pair of oppositely disposed arm portions connected to the respective ends of said bridge portion,
   said bridge portion being normally bowed whereby said bridge portion can be readily flexed between an operative and inoperative position,
   said bridge portion having means formed on the ends thereof adapted to complement the engaging surfaces of a holder,
   and a length of dental floss connected to an extended between said arm portions whereby said floss is tensioned when said bridge is flexed to its operative position.

10. The invention as defined in claim 9 wherein the means formed on the ends of said bridge define a notch.

11. The invention as defined in claim 9 wherein said member is defined as an integrally molded parts of a relatively inexpensive material whereby said member is rendered readily disposable and expendible.

12. A dental unit for effecting the cleaning of food particles and/or plaque formed between the crevices or spaces between one's teeth comprising:
    a handle means and a readily disposable dental floss holder means adapted to be detachably connected to said handle means,
    said handle means including an elongated handle portion, and a head portion connected to said handle portion,
    said head portion having oppositely disposed end jaw portions,
    said end jaw portions being inwardly turned,
    said head portion having a concaved curved portion extending between said jaw portions,
    said head portion having a recessed area intermediate said concaved curved portion,
    and said floss holder means comprising opposed extension arms and a flexible bridge portion interconnected between said extension arms,
    said bridge being normally convexly curved between said arm extensions whereby the distance measured along the curve of said bridge is slightly greater than the distance between said end jaw portions,
    a length of dental floss connected between said arm extensions,
    said holder being detachably connected to said head portion between said jaw portions by deflecting said convexly curved bridge toward the concaved head portion to wedge said bridge in secured position between said jaw portions,
    said jaw portion and adjacent ends portions of said bridge have complementary engaging surfaces for securing said floss holder to said head portion for use in any position.

13. The dental unit as defined in claim 12 wherein said head portion is disposed at an angle normal to the elongated handle portion.

14. The dental unit as defined in claim 12 wherein said head portion is disposed in longitudinal alignment with the elongated handle portion.

* * * * *